United States Patent
Bohner et al.

(10) Patent No.: US 7,485,354 B2
(45) Date of Patent: Feb. 3, 2009

(54) THERMAL PROTECTION SYSTEM FOR A VEHICLE

(75) Inventors: Richard Arthur Bohner, Palos Verdes Estates, CA (US); David Eric Daws, San Pedro, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 352 days.

(21) Appl. No.: 11/471,184

(22) Filed: Jun. 20, 2006

(65) Prior Publication Data
US 2007/0292654 A1    Dec. 20, 2007

(51) Int. Cl.
*B64G 1/58* (2006.01)
(52) U.S. Cl. ............... 428/60; 428/74; 428/76; 428/223; 244/121; 244/171.7
(58) Field of Classification Search ............ 428/76, 428/60, 74, 223; 244/171.7, 121
See application file for complete search history.

(56) References Cited

U.S. PATENT DOCUMENTS

| 4,344,591 | A | * | 8/1982 | Jackson | 244/159.1 |
| 4,578,527 | A | * | 3/1986 | Rancourt et al. | 136/256 |
| 5,624,622 | A |   | 4/1997 | Boyce et al. | 264/258 |
| 5,741,574 | A |   | 4/1998 | Boyce et al. | 428/119 |
| 6,613,427 | B1 | * | 9/2003 | Morrison et al. | 428/323 |

* cited by examiner

*Primary Examiner*—Alexander Thomas
(74) *Attorney, Agent, or Firm*—Louis L. Dachs

(57) ABSTRACT

The invention is a thermal insulation tile for providing thermal protection of the external surface of a vehicle. In detail, the tile includes a rigid ceramic core having top and bottom surfaces, side surfaces and parallel front and rear surfaces at a 15 to 45 degree angle to said top surface. A cover completely surrounds the core and is bonded thereto. A plurality of rigid rods extends through the core and the cover and are bonded thereto. The rods are at an angle of between 10 and 30 degrees to the top surface of the core, with the angle thereof in an angular direction opposite to the front and rear surfaces of the core.

16 Claims, 2 Drawing Sheets

THERMAL PROTECTION SYSTEM FOR A VEHICLE

BACKGROUND OF THE INVENTION

1. Field of the Invention

The invention relates to the field of thermal insulation systems and, in particular, to a thermal insulation system for use on high speed aircraft or spacecraft.

2. Description of Related Art

High speed aircraft, (Mach 4 and above) and spacecraft, like the space shuttle, which is subjected to extreme heat and aerodynamic loads upon re-entry into the atmosphere, require thermal protection systems. The space shuttle uses a heat resistant nose cone and special treatments on the leading edges of the airfoils. Typically, this material comprises a carbon matrix reinforced with carbon fibers. However, ceramic tiles are used elsewhere along with thermal blankets as disclosed in U.S. Pat. No. 4,151,800 Thermal Insulation Protection Means by R. I. Dottz, et al. and coated Nomax® depending upon the severity of heating. The ceramic tiles or bricks are bonded to the aluminum fuselage with gap filler material there between. While these tiles have worked successfully, on future vehicles, stronger and more damage resistant tiles are desirable.

U.S. Pat. No. 5,741,574 Truss Reinforced Foam Sandwich and U.S. Pat. No. 5,624,622 Method Of Forming A Truss Reinforced Foam Sandwich Construction both by J. S. Boyce, et al. disclose a foam core sandwiched between face sheets. The foam core is reinforced with tow members extending therethrough and retained by the adhesive bonding the face sheets to the core. While the concept of reinforcing the foam core is useful, the sandwich construction is not suitable for use as a replacement tile on vehicles such as the space shuttle or future versions thereof. What is needed is an improved tile that is stronger, but light in weight and provides increased resistance to aerodynamic abrasion.

Thus it is a primary object of the invention to provide an improved tile for use on high speed aircraft or spacecraft that is structurally stronger than existing tiles.

It is another primary object of the invention to provide an improved tile for use on high speed aircraft or spacecraft that is structurally stronger than existing tiles and is still light in weight.

It is a further object of the invention to provide an improved tile for use on high speed aircraft or spacecraft that is structurally stronger than existing tiles, light in weight, and provides increased resistance to abrasion.

SUMMARY OF THE INVENTION

The invention is a thermal insulation tile for providing thermal protection of the external surface of a vehicle. In detail, the tile includes a rigid ceramic core having top and bottom surfaces, side surfaces and parallel front and rear surfaces at a 15 to 45 degree angle to the top surface. Preferably, this angle is between 25 and 30 degrees. A cover completely surrounds the core and is bonded thereto. A plurality of rigid rods extend through the core and the cover and are bonded thereto. The rods are at an angle of between 10 and 30 degrees to the top surface of the core, with the angle thereof in an angular direction opposite to the front and rear surfaces of the core. Preferably, this angle is between 15 and 25 degrees. The top surface and at least a contiguous portion of the front and rear surfaces as well as the side surfaces of the covered core is coated with a high emissivity coating.

Preferably the core is made of alumina/silica and oxide based ceramic fibers. The rods are made of filamentary material. The cover is made of alumina/silica ceramic materials. The coating is made of glassy ceramic materials containing dark colored filer material. The tile would be bonded to the surface of the vehicle by an adhesive and gap filler between the individual tiles.

Such a reinforced tile would have increased strength, while still being light in weight. Because of the angled front and rear surfaces, its resistance to abrasion, especially between the tiles would be greatly reduced.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
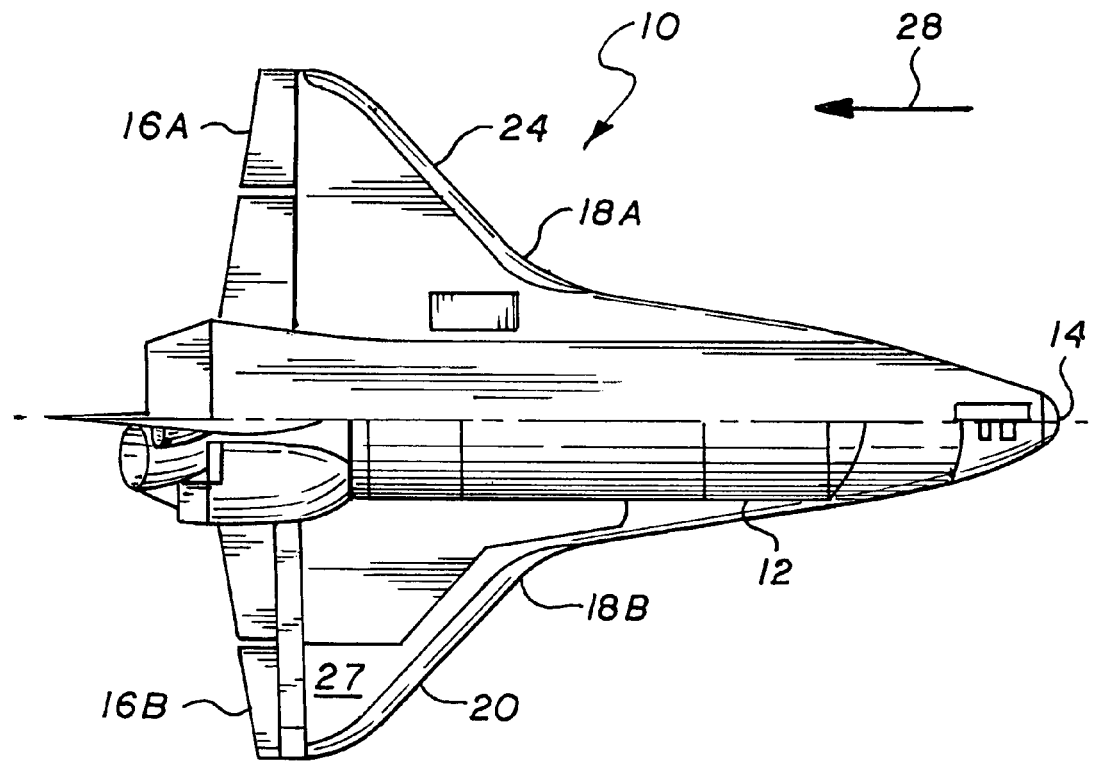
FIG. 1 is a split platform view of a space shuttle vehicle showing both the upper and lower surfaces thereof.
Figure 2:
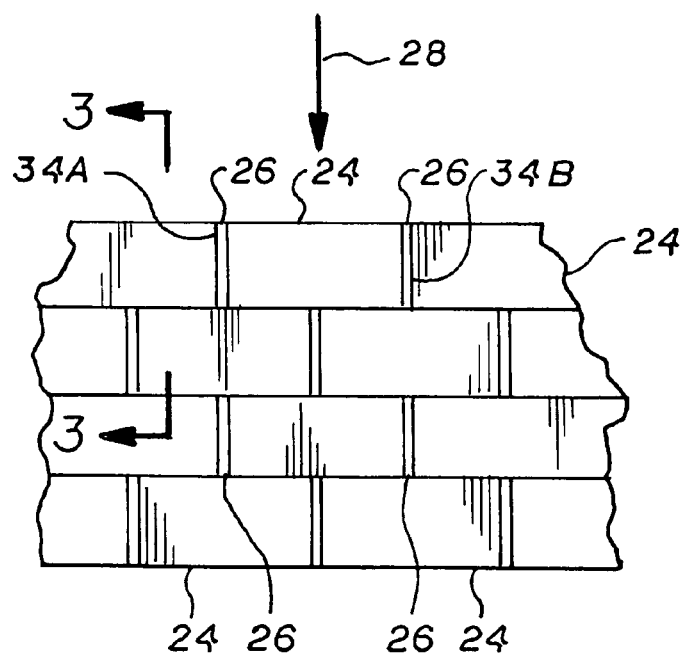
FIG. 2 is an enlarged view of a portion of the spacecraft shown in FIG. 1
Figure 3:
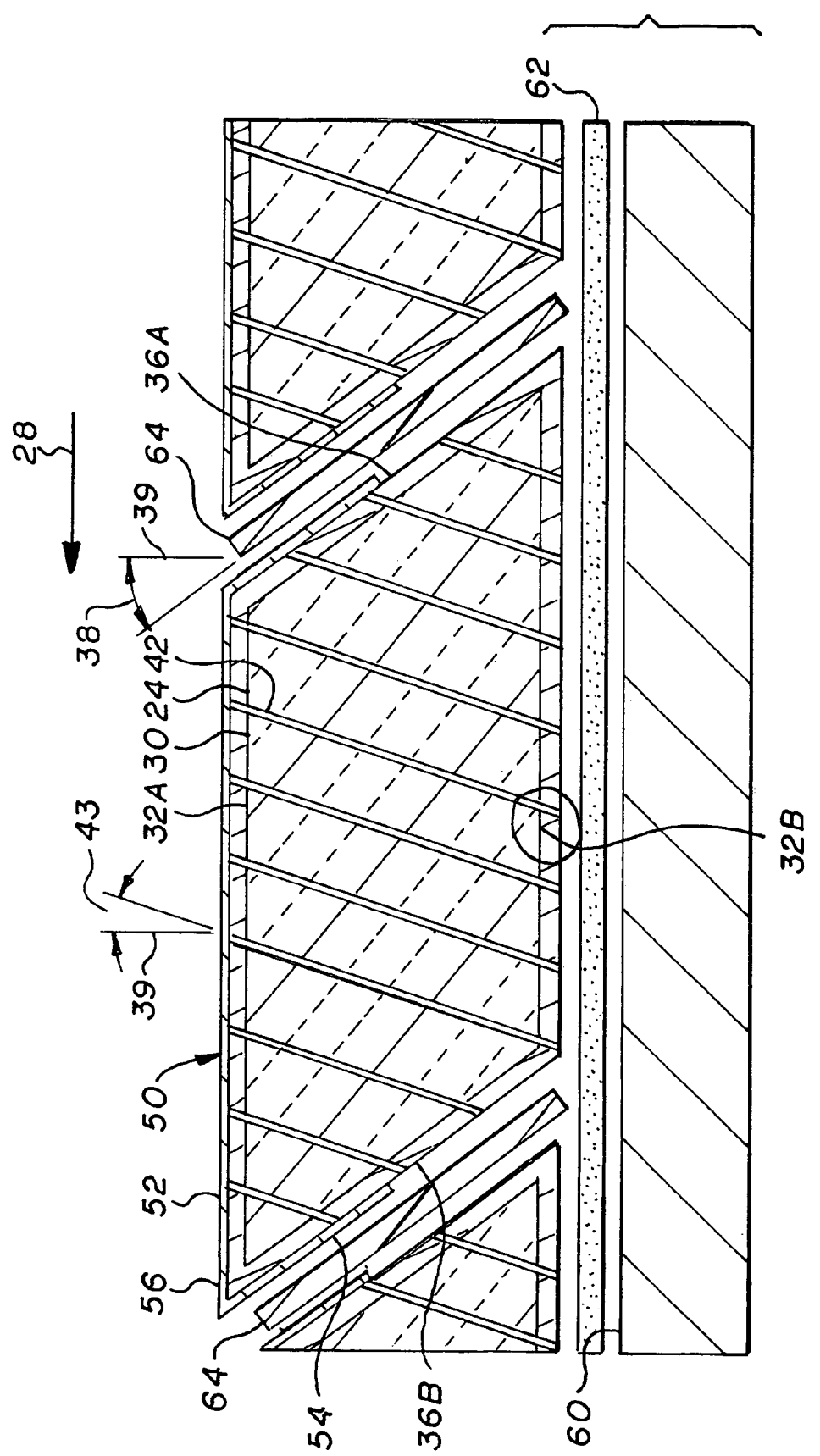
FIG. 3 is a cross-sectional view of FIG. 2 taken along the line 3-3.

Referring to FIGS. 1-3, the spacecraft, generally indicated by numeral 10 includes a fuselage 12 with a nose portion 14 wings 16A and 16B having leading edges 18A and 18B, respectively. It is typical in such vehicles that the nose portion 14 and leading edges 18A and 18B of the wings 16A and 16B require specialized assemblies designed to absorb the most severe temperatures, such as carbon matrix/carbon fiber composites. However, the remainder of the spacecraft 10 can be covered in thermal blankets 20 as disclosed in U.S. Pat. No. 4,151,800 Thermal Insulation Protection Means by R. I. Dottz, et al. or a special tile 24. The remainder of the surfaces are covered with coated Nomax.® felt. 27. Referring particularly to FIG. 2, the tiles 24 are staged to provide a discontinuous gap 26 between the tiles in the direction of airflow, indicated by arrow 28.

Referring particularly to FIGS. 2 and 3, the tile structure 24 includes inner ceramic core 30 made of alumina/silica and oxide-based ceramic 8 fibers. Such core 30 material is available from Forrest Machining Incorporated, Valencia, Calif. or ATK/COI Ceramics, San Diego, Calif. The core 30 includes: parallel top and bottom surfaces 32A and 32B, respectively; and parallel side surfaces 34A and 34B. The front surface 36A and back surface 36B are also parallel to each other, but at an angle 38 of between 15 and 45 degrees to a normal line, indicated by numeral 39 to the top surface 32A, such that front and rear surfaces slant away from the direction of airflow 28. Preferably, the angle 38 is between 25 and 30 degrees.

Installed through the core 30 are a plurality of rods 42. The rods 42, which are typically 0.020 inch in diameter, but can range up to 0.040 inch in diameter, are composed of oxide based ceramic fibers. For example, 3M Corporation Nextel® 720 mullite fibers, although other fibers such as Nextel® 312, 440, or 610 can be used. The process for installing the rods is described in U.S. Pat. No. 5,741,574 Truss Reinforced Foam Sandwich and U.S. Pat. No. 5,624,622 Method Of Forming A Truss Reinforced Foam Sandwich Construction both by J. S. Boyce, et al. now herein incorporated by reference. In summary the core is drilled with holes at the appropriate angles, impregnated tow material (coated filamentary material) is installed in the holes and the assembly is heated to a curing temperature. At this point the rods are rigid and protrude slightly out of the core 30.

The core 30 with rods 42 installed is encapsulated (wrapped) with a cover 50 such that the rods protrude through the over. The Cover 50 is composed of a ceramic matrix composite (CMC) material to create a hard protective shell. The CMC is an oxide/oxide ceramic composite that is normally reinforced with Alumina and Silica material fibers. For example 3M Corporation Nextel® 312 or 720 fibers. Suppliers of cover material 50 are ATK/COI Ceramics and Applied Poleramic, Incorporated, Benicia, Calif. The matrix is formed using sol gel materials or other precursors provided by the CMC suppliers, such as silicone filled with alumina particulates. The core 30 and cover 50 are heated until the cover is fused into a rigid coating bonded to the core 30 and the ends of the rods 42. A typical firing temperature for fusing the rods 42 to core 30 is 1800° F. If the rods 42 are properly sized, then the external top surface 52 of the cover 50 will essentially be smooth. If not, a subsequent machining operation to cut off any protruding ends of the rods 42 may be necessary to insure that the surface of cover 50 is smooth.

The top surface 52 and adjacent side surfaces 54 of the cover 50, are coated with a high emissivity coating 56. For this application the coating 56 is composed of a silica based glassy ceramic material filled with dark colored particulates, such as molybdenum disilicide or other high temperature resistant filler. The coating is applied to top surface 52 and side surfaces 54

The coating 56, depending upon the formulation is either cured at room temperature or heated to 935° F. or above, depending upon the material coating selected. The coating 56 dramatically increases the ability of the tile to absorb and re-radiate energy, improving thermal efficiency and performance. Suitable coating material 56 can be obtained from Applied Thin Films, Incorporated, Evanston, Ill. or Aremco Products, Valley Cottage, N.Y.

The tile 24 is bonded to the surface 60 of the vehicle 10 by means of an adhesive layer 62. The adhesive layer 62 is typically a two part silicone based material; for example, phenyl based silicone with iron oxide filler. Providers of a suitable adhesive are Morton Industries, Gardena, Calif. (a distributor for Dow Corning) and General Electric Sealants through a vast number of distributors. Finally, a gap filler material 64 is inserted between the tiles 24. Such gap filer materials are made of silicone containing ceramic fibers or fabric. They are available from Morton Industries and General Electric through its distributors.

Thus it can be seen that the above tile design can provide increased thermal protection because of its unique shape and combination of core, with reinforcement rods, and ceramic cover.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to aircraft and spacecraft industries.

The invention claimed is:

1. A thermal insulation tile for providing thermal protection of the external surface of vehicle, the tile comprising:
   a rigid ceramic core having top and bottom surfaces, side surfaces and parallel front and rear surfaces at a 15 to 45 degree angle to said top surface;
   a cover completely surrounding said core and bonded thereto; and
   a plurality of rigid rods extending through said core and said cover and bonded thereto, all of said rods at an angle of between 10 and 30 degrees to said top surface of said core, said angle in an angular direction opposite to said front and rear surfaces of said core.

2. The tile as set forth in claim 1 wherein said top surface and at least a contiguous portion of said front and rear surfaces as well as said side surfaces is coated with high emissivity coating.

3. The tile as set forth in claim 2 wherein said front and rear surfaces are at an angle of between 25 and 30 degrees to said top surface of said core.

4. The tile as set forth in claim 2 wherein said rods are at an angle of between 15 and 25 degrees to said top surface of said core.

5. The tile as set forth in claim 2 wherein said core is made of alumina/silica and oxide based ceramic fibers.

6. The tile as set forth in claim 2 wherein said rods are made of ceramic filamentary material.

7. The tile as set forth in claim 2 wherein said cover is made of alumina/silica ceramic composite materials.

8. The tile as set forth in claim 2 wherein said coating is made from glassy ceramic materials containing dark colored filler material.

9. A vehicle subject to airflow over its external surfaces, the vehicle comprising;
   a plurality of thermal insulation tiles for providing thermal protection of at least a portion of the external surface of vehicle, the tiles comprising:
   a rigid ceramic core having top and bottom surfaces, side surfaces and parallel front and rear surfaces at a 15 to 45 degree angle to said top surface, said angle in the direction of the air flow over the surface;
   a cover completely surrounding said core and bonded thereto;
   a plurality of rigid rods extending through said core and said cover and bonded thereto, said rods at an angle of between 10 and 30 degrees to said top surface of said core, all of said angle in an angular direction opposite to said front and rear surfaces of said core;
   a layer of sealant on said side surface and said front and rear surfaces for sealing said plurality of tiles together; and
   a layer of adhesive on said bottom surface of said plurality of tiles bonding them to the external surfaces.

10. The tile as set forth in claim 9 wherein said top surface and at least a contiguous portion of said front and rear surfaces as well as said side surfaces is coated with high emissivity coating.

11. The tile as set forth in claim 10 wherein said front and rear surfaces are at an angle of between 25 and 30 degrees to said top surface of said core.

12. The tile as set forth in claim 10 wherein said rods are at an angle of between 15 and 25 degrees to said top surface of said core.

13. The tile as set forth in claim 10 wherein said core is made of alumina/silica and oxide based ceramic fibers.

14. The tile as set forth in claim 10 wherein said rods are made of a ceramic filamentary material.

15. The tile as set forth in claim 10 wherein said cover is made of alumina/silica ceramic composite materials.

16. The tile as set forth in claim 10 wherein said coating is made of glassy ceramic materials containing dark colored filler material.

* * * * *